US012700190B2

(12) United States Patent
Ishii

(10) Patent No.: US 12,700,190 B2
(45) Date of Patent: Aug. 4, 2026

(54) INFORMATION PROCESSING APPARATUS, METHOD FOR CONTROLLING THE SAME, AND MEDIUM

(71) Applicant: CANON KABUSHIKI KAISHA, Tokyo (JP)

(72) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/586,234

(22) Filed: Feb. 23, 2024

(65) Prior Publication Data

US 2024/0303941 A1 Sep. 12, 2024

(30) Foreign Application Priority Data

Mar. 8, 2023 (JP) .................................. 2023-035957

(51) Int. Cl.
*G06T 19/00* (2011.01)
(52) U.S. Cl.
CPC .................................. *G06T 19/006* (2013.01)
(58) Field of Classification Search
CPC ........... G06T 19/006; A63F 2300/8082; A63F 13/216; G06F 3/011
See application file for complete search history.

(56) References Cited

U.S. PATENT DOCUMENTS

| | | | | |
|---|---|---|---|---|
| 2015/0265920 A1* | 9/2015 | Kim | ...................... | A63F 13/577 463/31 |
| 2022/0308654 A1* | 9/2022 | Chen | ........................ | A63F 13/65 |
| 2023/0342989 A1* | 10/2023 | Lehtiniemi | ............. | G06F 3/011 |
| 2024/0194045 A1* | 6/2024 | Lal | .......................... | G08B 21/02 |
| 2025/0032905 A1* | 1/2025 | Dasher | .................... | A63F 13/25 |

FOREIGN PATENT DOCUMENTS

| | | | | | |
|---|---|---|---|---|---|
| JP | 6401841 | B1 * | 10/2018 | ............. | G06F 3/013 |
| JP | 2018190432 | A | 11/2018 | | |
| JP | 2025110580 | A * | 7/2025 | | |
| WO | WO-2018200315 | A1 * | 11/2018 | ............. | G06F 3/011 |
| WO | WO-2023157471 | A1 * | 8/2023 | ............. | G06F 3/012 |
| WO | WO-2025169262 | A1 * | 8/2025 | | |

* cited by examiner

*Primary Examiner* — Chante E Harrison
(74) *Attorney, Agent, or Firm* — Canon U.S.A., Inc. IP Division

(57) ABSTRACT

An information processing apparatus includes one or more processors and one or more memories. The one or more processors and the one or more memories are configured to acquire play area information about a first play area indicating a movable range of a first user in a real space, set a second play area indicating a movable range of a second user in the real space, and set the second play area according to whether the first play area overlaps the set second play area.

9 Claims, 10 Drawing Sheets

INFORMATION PROCESSING APPARATUS, METHOD FOR CONTROLLING THE SAME, AND MEDIUM

BACKGROUND

Technical Field

The present disclosure relates to an information processing apparatus, a method for controlling the information processing apparatus, and a medium.

Description of the Related Art

A Head Mounted Display (HMD) may be used as a device for experiencing Virtual Reality (VR) content. For example, generating an image (a moving image or still image) according to the position and orientation of a user of an HMD and displaying the image on the HMD enable providing the user with an experience as if the user were moving in a virtual space. Many of HMDs used to experience VR content are designed to cover the user's field of view to improve the feeling of immersion in the experience. In such a case, the user experiencing a VR content using an HMD can hardly confirm the environment. Examples of events likely to occur include an event in which the user collides against an obstacle such as a wall while the user is moving. Japanese Patent Application Laid-Open No. 2018-190432 discloses a technique for presetting a movable range of a user as a play area when an HMD is used.

SUMMARY

According to an aspect of the present disclosure, an information processing apparatus includes one or more processors and one or more memories. The one or more processors and the one or more memories are configured to acquire play area information about a first play area indicating a movable range of a first user in a real space, set a second play area indicating a movable range of a second user in the real space, and set the second play area according to whether the first play area overlaps the set second play area.

Further features of the present disclosure will become apparent from the following description of exemplary embodiments with reference to the attached drawings.

DESCRIPTION OF THE EMBODIMENTS

Figure 1:
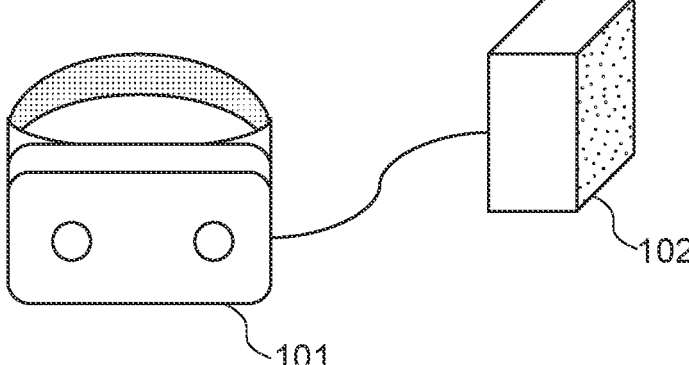
FIG. 1 illustrates an example of a system configuration of an image display system.

There may be a situation where a plurality of users individually experience a Virtual Reality (VR) content by using different head mounted displays (HMDs) in a common space. In such a situation, because a play area is independently set for each user, the play areas of the users may overlap each other, possibly resulting in a collision between the users.

In view of the above-described issue, the some exemplary embodiments are directed to suitably setting a play area for each of a plurality of users even in a situation where the plurality of users share a space.

Some exemplary embodiments of the present disclosure will be described below with reference to the accompanying drawings.

In the present specification and drawings, elements having substantially identical functions are assigned the same reference numerals and duplicated descriptions of the elements will be omitted.

A first exemplary embodiment of the present disclosure will be described below. An example of a system configuration of an image display system according to the present exemplary embodiment will be described below with reference to FIG. 1. The image display system according to the present exemplary embodiment includes a head mounted display (HMD) 101 and an image processing apparatus 102. The HMD 101 and the image processing apparatus 102 are connected with each other via a predetermined communication path so that they can communicate image data and other various data and various control signals. Referring to the example in FIG. 1, the HMD 101 and the image processing apparatus 102 are connected with each other via a cable conforming to High-Definition Multimedia Interface (HDMI) and Universal Serial Bus (USB). The type of the communication path for connecting the image processing apparatus 102 and the HMD 101 is not particularly limited. As a specific example, a communication path may be established between the HMD 101 and the image processing apparatus 102 by wireless communication, such as Bluetooth®.

The configuration illustrated in FIG. 1 is to be considered as illustrative and does not limit the system configuration of the image display system according to the present exemplary embodiment. As a specific example, an input apparatus, such as a controller and a keyboard (not illustrated), for receiving an input from a user may be connected to the image processing apparatus 102 via a predetermined communication path.

The image processing apparatus 102 is equivalent to an example of an "information processing apparatus" according to the present exemplary embodiment.

Figure 2:
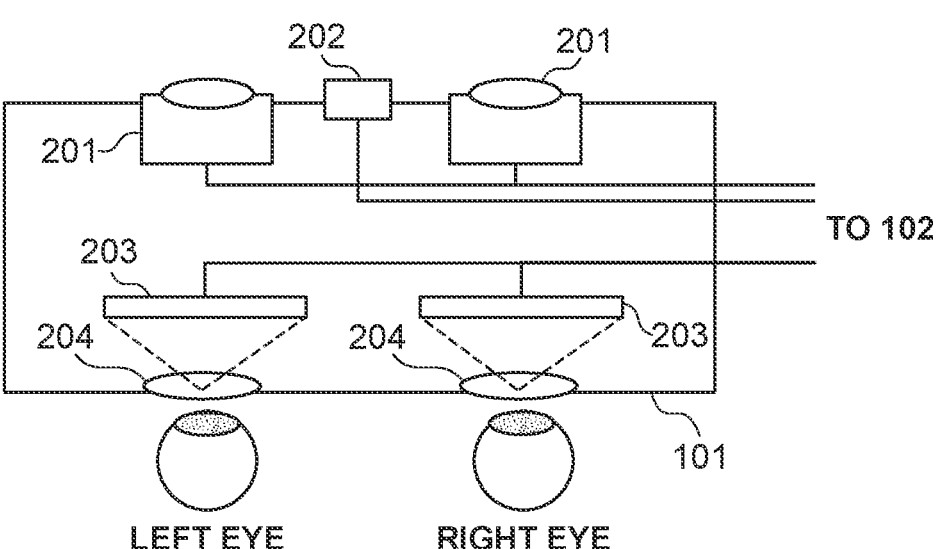
FIG. 2 illustrates an example of an internal configuration of a head mounted display (HMD).

An example of an internal configuration of the HMD 101 will be described below with reference to FIG. 2. The HMD 101 includes a plurality of imaging apparatuses 201 (e.g., RGB cameras) and an Inertial Measurement Unit (IMU), such as a gyro sensor and an acceleration sensor, to track the position of the HMD 101 itself.

The HMD 101 has a configuration for acquiring depth information indicating the distance to an object located in an external environment. Referring to the example in FIG. 2, the HMD 101 includes a distance sensor 202, such as LiDAR, as a configuration for acquiring depth information.

As a configuration for displaying an image, the HMD 101 includes displays 203 corresponding to both eyes implemented by a display panel such as a liquid crystal panel and an organic electroluminescence (EL) panel. An eyepiece 204 is disposed between each of the displays 203 and each of both eyes of the user wearing the HMD 101. This configuration enables the user wearing the HMD 101 to observe an enlarged virtual image for the display images displayed on the displays 203 via the eyepieces 204.

The HMD 101 mounted on the head of the user (not illustrated) enables the user's left eye to observe (the enlarged virtual image of) the display image for the left eye and enables the user's right eye to observe (the enlarged virtual image of) the display image for the right eye. The image processing apparatus 102 generates the display image for left eye and the display image for the right eye, and displays these images on the displays 203 of the HMD 101. In this case, the image processing apparatus 102 may provide a parallax between the display image for the left eye and the display image for the right eye. The parallax corresponds to the distance between both eyes (for example, the distance between the eyepieces 204 corresponding to both eyes) of the user wearing the HMD 101. Applying such control enables providing the user wearing the HMD 101 with an image perception accompanied by a sense of depth.

Although the present exemplary embodiment will be described below, focusing on the system configuration in which the image processing apparatus 102 is implemented as an apparatus independent of the HMD 101, the configuration of the image display system according to the present exemplary embodiment is not limited to the example. As a specific example, the image display system according to the present exemplary embodiment may be implemented by an integrated HMD system into which the configuration equivalent to the image processing apparatus 102 is incorporated.

Figure 3:
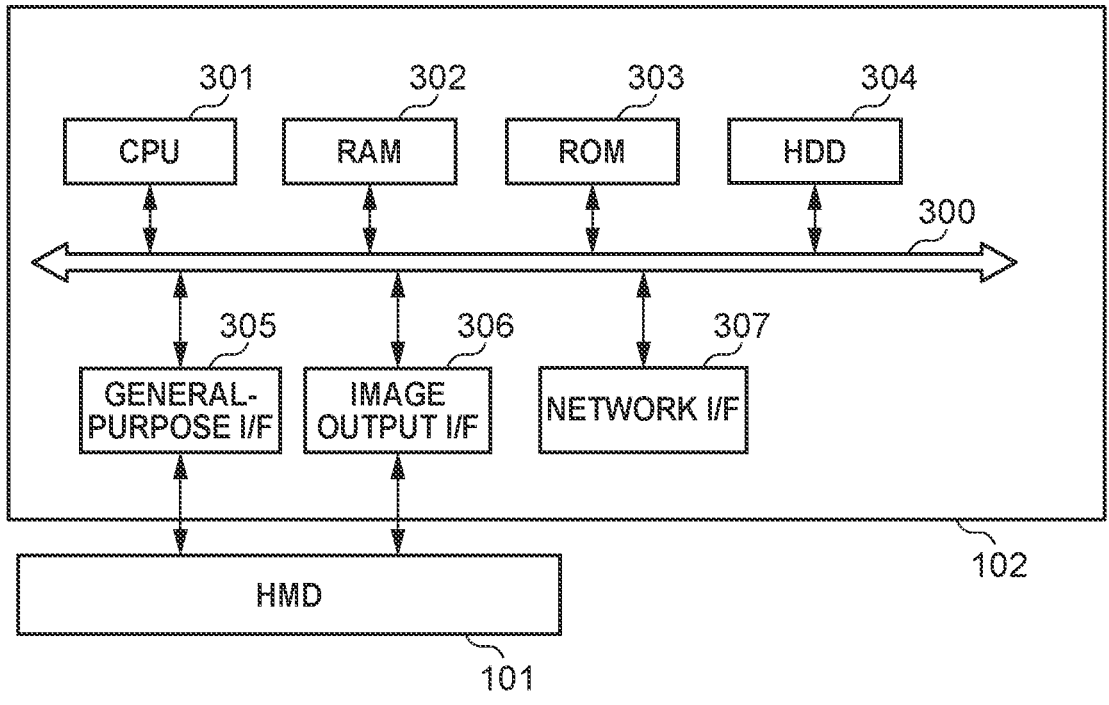
FIG. 3 illustrates an example of a hardware configuration of an image processing apparatus.

An example of a hardware configuration of the image display system according to the present exemplary embodiment will be described below, particularly focusing on the configuration of the image processing apparatus 102, with reference to FIG. 3. The image processing apparatus 102 includes a Central Processing Unit (CPU) 301, a Random Access Memory (RAM) 302, and a Read Only Memory (ROM) 303. The image processing apparatus 102 also includes a Hard Disk Drive (HDD) 304, a general-purpose interface (I/F) 305, a video output I/F 306, and a network I/F 307. The above-described components of the image processing apparatus 102 are connected with each other so that they can communicate information via a main bus 300.

The CPU 301 is a processor that totally controls each unit in the image processing apparatus 102.

The RAM 302 functions as the main memory of the CPU 301 and a work area. The ROM 303 stores programs to be executed by the CPU 301. The HDD 304 is a storage area for storing applications to be executed by the CPU 301 and data to be used for image processing. Not only the HDD 304 but also various types of storage devices are applicable as the storage area. As a specific example, an auxiliary storage device such as a Solid State Drive (SSD) may be used instead of or together with the HDD 304.

The general-purpose I/F 305, which is a serial bus interface conforming to the USB and IEEE1394 standards, is connected with, for example, the IMU and the distance sensor 202 provided on the HMD 101. The general-purpose I/F 305 enables the image processing apparatus 102 to acquire orientation information and a depth image up to a target object (an image with mapped depth information according to the result of measuring the distance to the target object for each pixel), from the HMD 101. The general-purpose I/F 305 is also used to acquire an image according to the result of imaging by the imaging apparatuses 201 of the HMD 101.

The video output I/F 306, such as HDMI and display port, is used to transmit to the HMD 101 the display image to be displayed on the displays 203 of the HMD 101.

The network I/F 307 is an interface for connecting the image processing apparatus 102 to a predetermined network. The configuration of the network I/F 307 may be suitably changed according to the type of the network to be connected and an applicable communication method.

Figure 4:
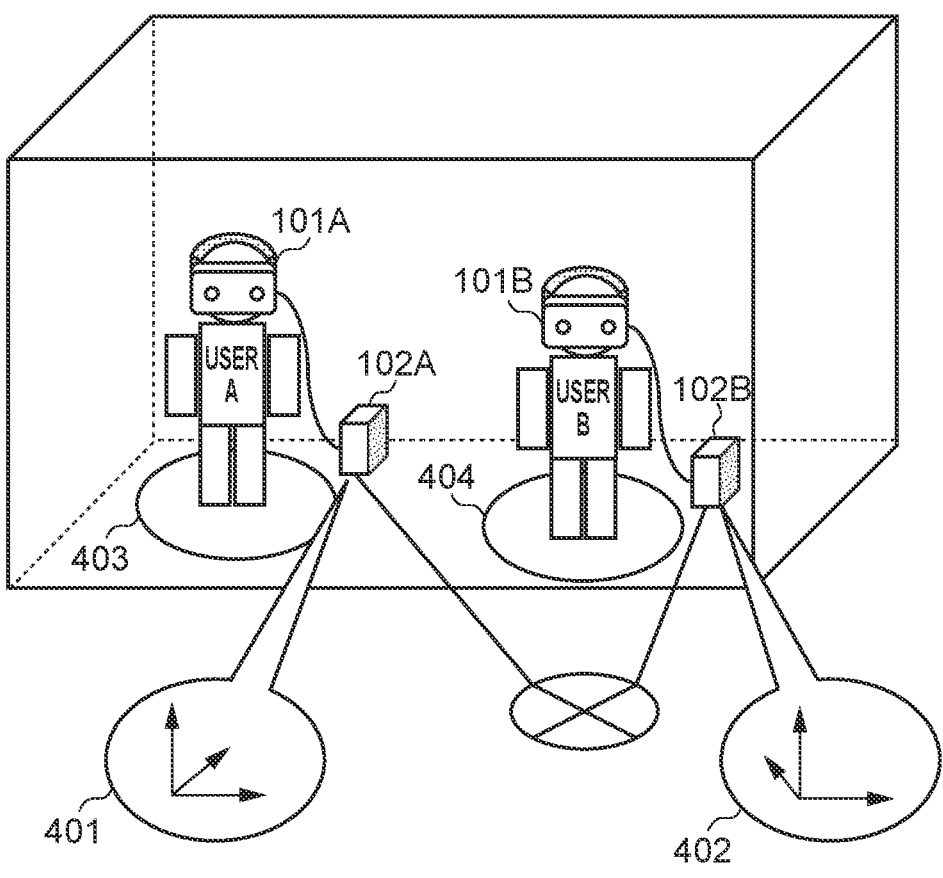
FIG. 4 illustrates an example of a case where a plurality of users use the image display system.

An example of a case where a plurality of users use the image display system illustrated in FIG. 1 will be described below with reference to FIG. 4. Referring to the example in FIG. 4, each of two different users (users A and B) wears the HMD 101 in a space (room). Hereinafter, the HMD worn by user A is referred to as an "HMD 101A", and the HMD worn by user B is referred to as an "HMD 101B". The HMD 101A is connected to the image processing apparatus 102A, and the HMD 101B is connected to the image processing apparatus 102B. The image processing apparatuses 102A and 102B are connected with a common network and able to communicate data and information with each other via the network. The type of the network connected with the image processing apparatuses 102A and 102B is not limited. Either a wire network or a wireless network is applicable. For example, when wireless communication is applied, a wireless network based on a known wireless technology, such as Wi-Fi and Bluetooth®, can be used as the network for connecting the image processing apparatuses 102A and 102B.

A play area 403 is equivalent to the play area set for user A and indicates the movable range of user A in a real space (for example, the movable range in the real space set for user A when a VR content is played). A play area 404 is equivalent to the play area set for user B and indicates the movable range of user B in the real space (for example, the movable range in the real space set for user B when a VR content is played).

A coordinate system 401 indicates a local coordinate system used by the image display system including the HMD 101A and the image processing apparatus 102A. This coordinate system sets the position of an object in the virtual space. In contrast, a coordinate system 402 indicates a local coordinate system used by the image display system including the HMD 101B and the image processing apparatus 102B. This coordinate system sets the position of an object in the virtual space.

For convenience, the present exemplary embodiment will be described below, centering on an example of processing for acquiring information about the play area 403 of user A, and updating the play area 404 of user B based on the information so that the play areas of users A and B do not overlap each other. In the following descriptions, the information about the play areas is also referred to as "play area information". The play area information may include, for example, information about the position and range of a target play area and information about the coordinate system (e.g., the local coordinate system) applied to the setting of the position and the range.

Figure 5:
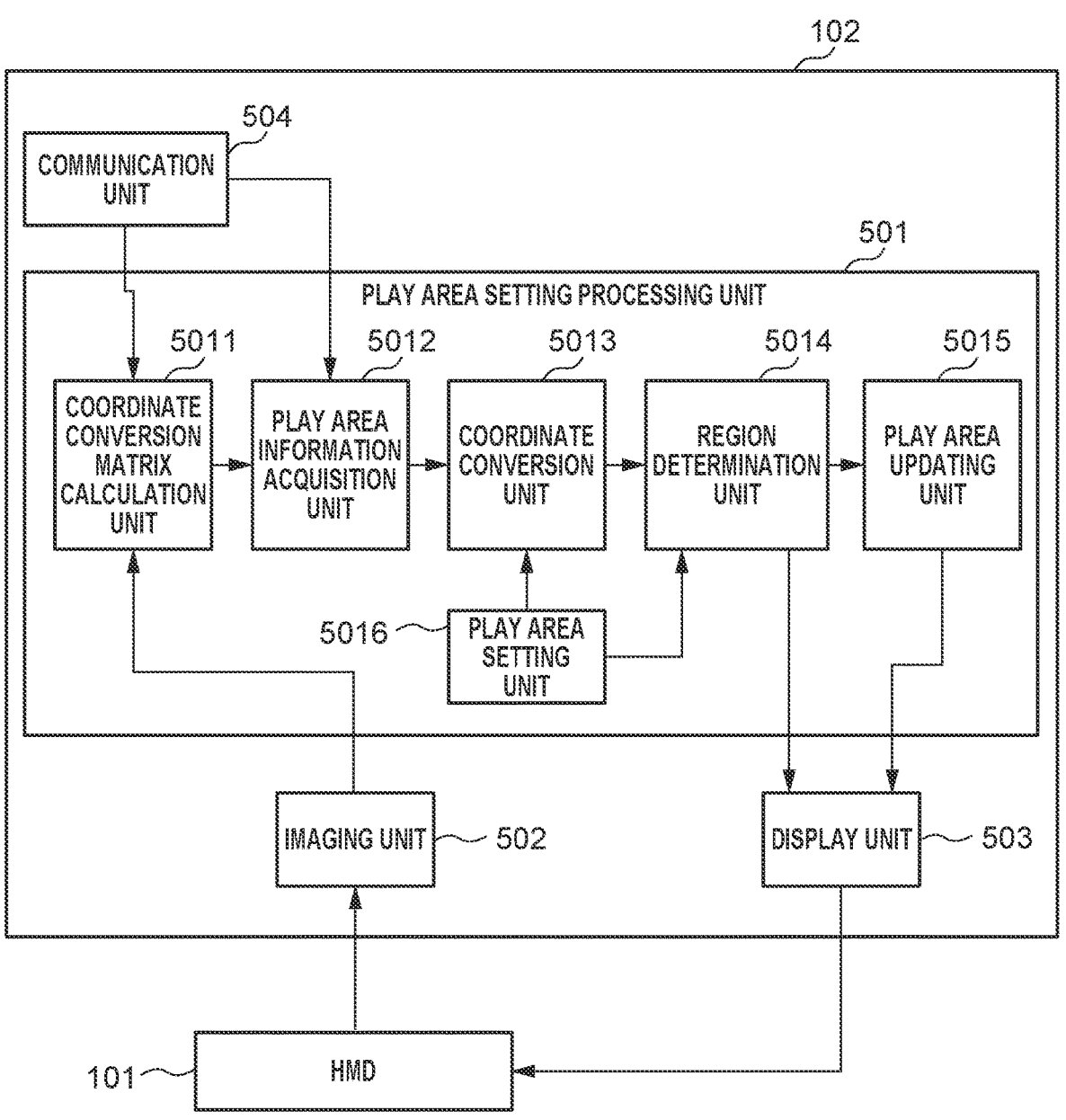
FIG. 5 illustrates an example of a functional configuration of the image processing apparatus.

An example of a functional configuration of the image system according to the present exemplary embodiment will be described below, particularly focusing on the configuration of the image processing apparatus 102, with reference to FIG. 5. The image processing apparatus 102 includes a play area setting processing unit 501, an imaging unit 502, a display unit 503, and a communication unit 504. The play area setting processing unit 501 includes a coordinate conversion matrix calculation unit 5011, a play area information acquisition unit 5012, a coordinate conversion unit 5013, a region determination unit 5014, a play area updating unit 5015, and a play area setting unit 5016.

The imaging unit 502 captures an image of a subject and outputs data of the captured image, such as a marker image (described below).

The display unit 503 displays various images and information, such as images related to a VR content and information indicating the play areas, on a predetermined display area (e.g., the displays 203 of the HMD 101).

The communication unit 504 communicates with other apparatuses (e.g., other image processing apparatuses) connected via a network to exchange various types of information, such as play area information.

The play area setting processing unit 501 sets a play area based on information obtained from the imaging unit 502 and the communication unit 504 and displays the result of the play area setting on the HMD 101 via the display unit 503.

The coordinate conversion matrix calculation unit 5011 calculates a coordinate conversion matrix for converting the coordinate systems 401 and 402 corresponding to users A and B, respectively, into a common coordinate system. Hereinafter, the world coordinate system is applied as the common coordinate system. Examples of applicable methods for setting the world coordinate system include a method for setting an Augmented Reality (AR) marker uniquely recognizable by the HMD 101 on the floor and determining the origin and axis directions with reference to the AR marker.

The play area information acquisition unit 5012 acquires play area information about the play area corresponding to user A from the image processing apparatus 102B via the communication unit 504.

The coordinate conversion unit 5013 converts the coordinates of the play areas corresponding to users A and B into the coordinates in the common coordinate system. The coordinate conversion unit 5013 converts the coordinates of the play area corresponding to user A from the coordinates in the local coordinate system into the coordinates in the world coordinate system by using the coordinate conversion matrix. The coordinate conversion unit 5013 converts the coordinates of the play area corresponding to user B from the coordinates in the local coordinate system into the coordinates in the world coordinate system by using the coordinate conversion matrix.

The play area setting unit 5016 sets the play area corresponding to user B.

The region determination unit 5014 determines whether the play areas corresponding to users A and B overlap each other.

The play area updating unit 5015 updates the play area corresponding to user B according to the result of determining whether the play areas overlap each other by the region determination unit 5014.

Figure 6:
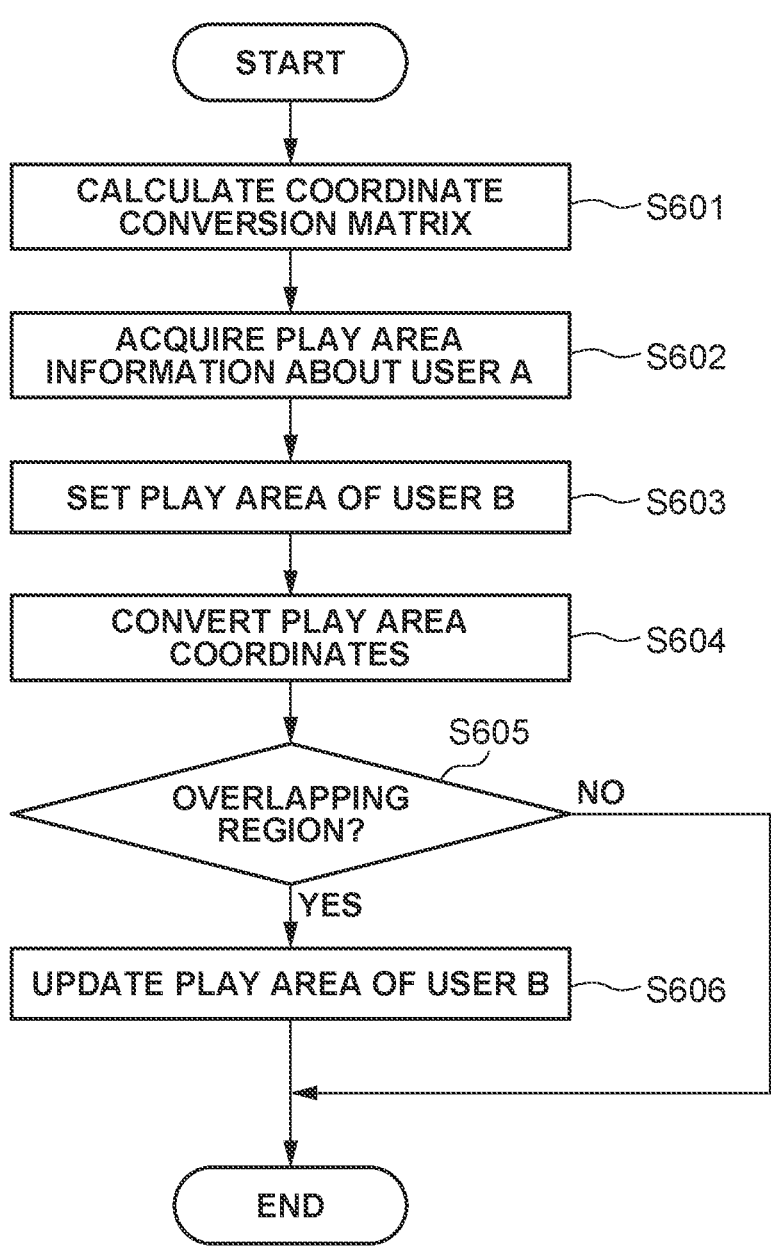
FIG. 6 is a flowchart illustrating an example of processing of the image display system.

An example of processing of the image display system according to the present exemplary embodiment will be described below, particularly focusing on the processing performed by the image processing apparatus 102B, with reference to FIG. 6. The series of processing illustrated in FIG. 6 is implemented when a program stored in the ROM 303 or HDD 304 is loaded into the RAM 302 and then executed by the CPU 301 in the image processing apparatus 102B. Thus, the CPU 301 performs the role of each component illustrated in FIG. 5.

In step S601, the coordinate conversion matrix calculation unit 5011 calculates a coordinate conversion matrix MB for converting the local coordinate system 402 corresponding to user B into the world coordinate system based on the data of the captured image of the real space reflecting the AR marker captured by the imaging unit 502. The coordinate conversion matrix calculation unit 5011 acquires the coordinate conversion matrix MA for converting the local coordinate system 401 corresponding to user A into the world coordinate system, from the image processing apparatus 102A, through communication via the communication unit 504.

In step S602, the play area information acquisition unit 5012 acquires play area information corresponding to user A from the image processing apparatus 102A through communication via the communication unit 504. Although the present exemplary embodiment will be described below on the premise that the play areas are circular-shaped for the sake of simplification, the shapes of the play areas are not limited to the circular shape. The play area information according to the present exemplary embodiment includes information indicating the center coordinates and radius of the circle as information for setting a range of the target play area.

Figure 7:
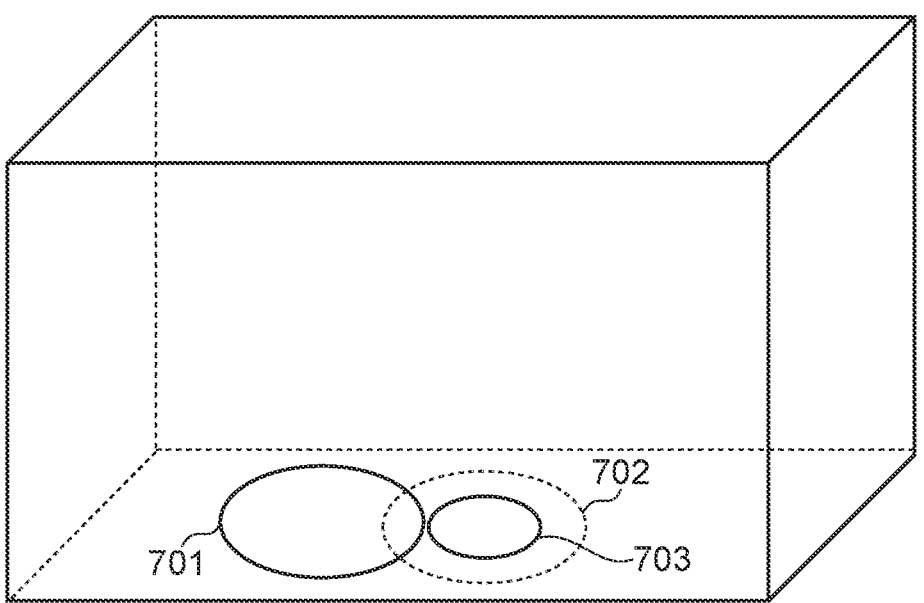
FIG. 7 illustrates examples of play areas.

FIG. 7 illustrates examples of play areas according to the present exemplary embodiment. Referring to the examples in FIG. 7, a play area 701 indicates the play area set for user A.

In step S603, the play area setting unit 5016 sets a play area of user B. As a specific example, the play area setting unit 5016 sets the center coordinates and radius of the circle as the play area corresponding to user B in the local coordinate system.

Referring to FIG. 7, the play area 702 indicates an example of the play area set for user B in the processing in step S603.

In step S604, the coordinate conversion unit 5013 performs the coordinate conversion applicable to the play area setting. As a specific example, the coordinate conversion unit 5013 converts the center coordinates of the circle as the play area corresponding to user B set in step S603 into the world coordinate system by using the coordinate conversion matrix MB calculated in step S601. The coordinate conversion unit 5013 also converts the center coordinates of the circle as the play area of user A acquired in step S602 into the world coordinate system by using the coordinate conversion matrix MA acquired in step S601.

In step S605, the region determination unit 5014 determines whether the play areas of users A and B overlap each other by using information about the center coordinates of the play areas corresponding to users A and B converted in step S604 and the radii of the circles indicating the play areas.

When the region determination unit 5014 determines that the play areas of users A and B overlap each other (YES in step S605), the processing proceeds to step S606.

On the other hand, when the region determination unit 5014 determines that the play areas of users A and B do not overlap each other (NO in step S605), the processing exits the flowchart in FIG. 6. In this case, the processing skips step S606.

In step S606, the play area updating unit 5015 updates the play area corresponding to user B to a size that does not overlap with the play area of user A. As a specific example, the play area updating unit 5015 resizes the radius of the circle as the play area of user B to update the play area.

Referring to FIG. 7, a play area 703 indicates an example of the play area corresponding to user B updated by the processing in step S606. Referring to the examples in FIG. 7, the updated play area 703 has been resized not to overlap with the play area 701 corresponding to user A in comparison with the initially set play area 702 corresponding to user B.

The above-described processing enables updating the play area of user B based on the play area information corresponding to user A so that the play areas of users A and B do not overlap each other, thus resolving the contention between the play areas of users A and B. This makes it possible to prevent the occurrence of an event such as a user colliding with another user during the experiencing of VR content by using the HMD 101.

When updating the play area, the CPU 301 may apply control for displaying information about the play areas 701 and 702 corresponding to users A and B, respectively, and information about the updated play area 702 corresponding to user B on the displays 203 of the HMD 101B via the display unit 503. Applying such control enables user B to recognize the overlapping relation between the play areas 701 and 702 of users A and B, respectively, and the updated play area 702 corresponding to user B.

When the region determination unit 5014 determines that the play areas of users A and B overlap each other, the CPU 301 may apply control for displaying a warning indicating that the play areas overlap each other on the displays 203 of the HMD 101B via the display unit 503.

A second exemplary embodiment of the present disclosure will be described below, centering on an example of processing for updating the play areas according to the play area information corresponding to user A and the priority set to the play area corresponding to user B.

According to the present exemplary embodiment, the play area set for each user has a preset priority for each region. The priority setting to each play area may be made, for example, when the play areas are initially set. For the sake of simplification, the present exemplary embodiment will be described below on the premise that each play area is circular-shaped.

Examples of play areas according to the present exemplary embodiment will be described below with reference to FIG. 10. Referring to the examples in FIG. 10, a region 1003 indicates a region having a "High" priority setting in the play area set for user B. On the other hand, a region 1002 indicates a region having a lower priority setting than the priority setting for the region 1003 in the play area set for user B. For convenience, the following descriptions will be made on the premise that the region 1002 has a "Low" priority setting. These priorities may be set according to whether the distance from the center of the circle forming the play area exceeds a preset threshold value. According to the present exemplary embodiment, the above-described priorities of the relevant play area are used in a case where the play area of one user overlaps the play area of another user. More specifically, the priorities are used as information for distinguishing between a region to be preferentially assigned to the another user and a region of which the assignment to the another user is restricted.

Figure 8:
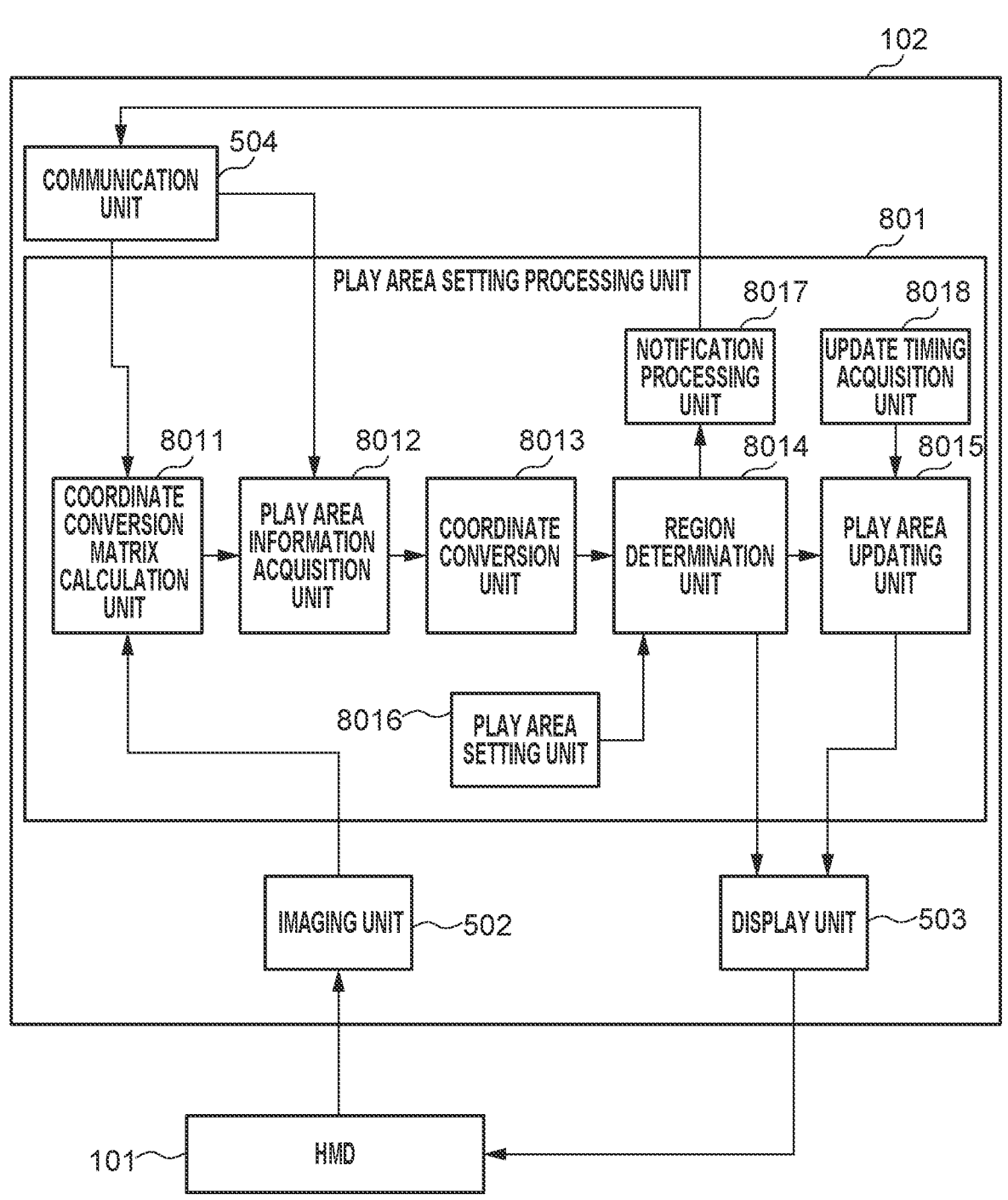
FIG. 8 illustrates another example of a functional configuration of the image processing apparatus.

An example of a functional configuration of the image display system according to the present exemplary embodiment will be described below, particularly focusing on the configuration of the image processing apparatus 102, with reference to FIG. 8. The image processing apparatus 102 includes a play area setting processing unit 801, an imaging unit 502, a display unit 503, and a communication unit 504.

The play area setting processing unit 801 includes a coordinate conversion matrix calculation unit 8011, a play area information acquisition unit 8012, a coordinate conversion unit 8013, a region determination unit 8014, a play area updating unit 8015, a play area acquisition unit 8016, and a notification processing unit 8017. The imaging unit 502, the display unit 503, and the communication unit 504 are substantially similar to the imaging unit 502, the display unit 503, and communication unit 504 illustrated in FIG. 5, and detailed descriptions of these units will be omitted.

The coordinate conversion matrix calculation unit 8011 calculates a coordinate conversion matrix for converting the coordinate systems 401 and 402 corresponding to users A and B, respectively, into a common coordinate system. In the following descriptions, the world coordinate system will be applied as the common coordinate system. The method for setting the world coordinate system is similar to that according to the first exemplary embodiment.

The play area information acquisition unit 8012 acquires the play area information about the play area corresponding to user A from the image processing apparatus 102A via the communication unit 504.

The coordinate conversion unit 8013 converts the coordinates of the play area corresponding to user A from the local coordinate system into the world coordinate system by using the coordinate conversion matrix. The coordinate conversion unit 8013 converts the coordinates of the play area corresponding to user B from the local coordinate system into the world coordinate system by using the coordinate conversion matrix.

The play area acquisition unit 8016 acquires information about the play area set for user B to recognize the play area based on the information. For this play area, a priority is preset for each region.

The region determination unit 8014 determines whether the play areas corresponding to users A and B overlap each other.

The play area updating unit 8015 updates the play area corresponding to user B according to whether the play areas corresponding to users A and B overlap each other.

The notification processing unit 8017 communicates with the image processing apparatus 102A via the communication unit 504 according to whether the play areas corresponding to users A and B overlap each other, to instruct the image processing apparatus 102A to notify user A of information indicating that the play areas corresponding to users A and B overlap each other. In response to the instruction from the notification processing unit 8017, for example, the image processing apparatus 102A may notify user A of information indicating that the play areas overlap each other via the HMD 101A.

The update timing acquisition unit 8018 acquires information indicating the timing to permit updating the play area. As the information indicating the timing to permit updating the play area, for example, preset information may be read from the HDD 304 into the RAM 302. The information indicating the timing to permit updating the play area may be acquired based on a user input via a controller (not illustrated).

Figure 9:
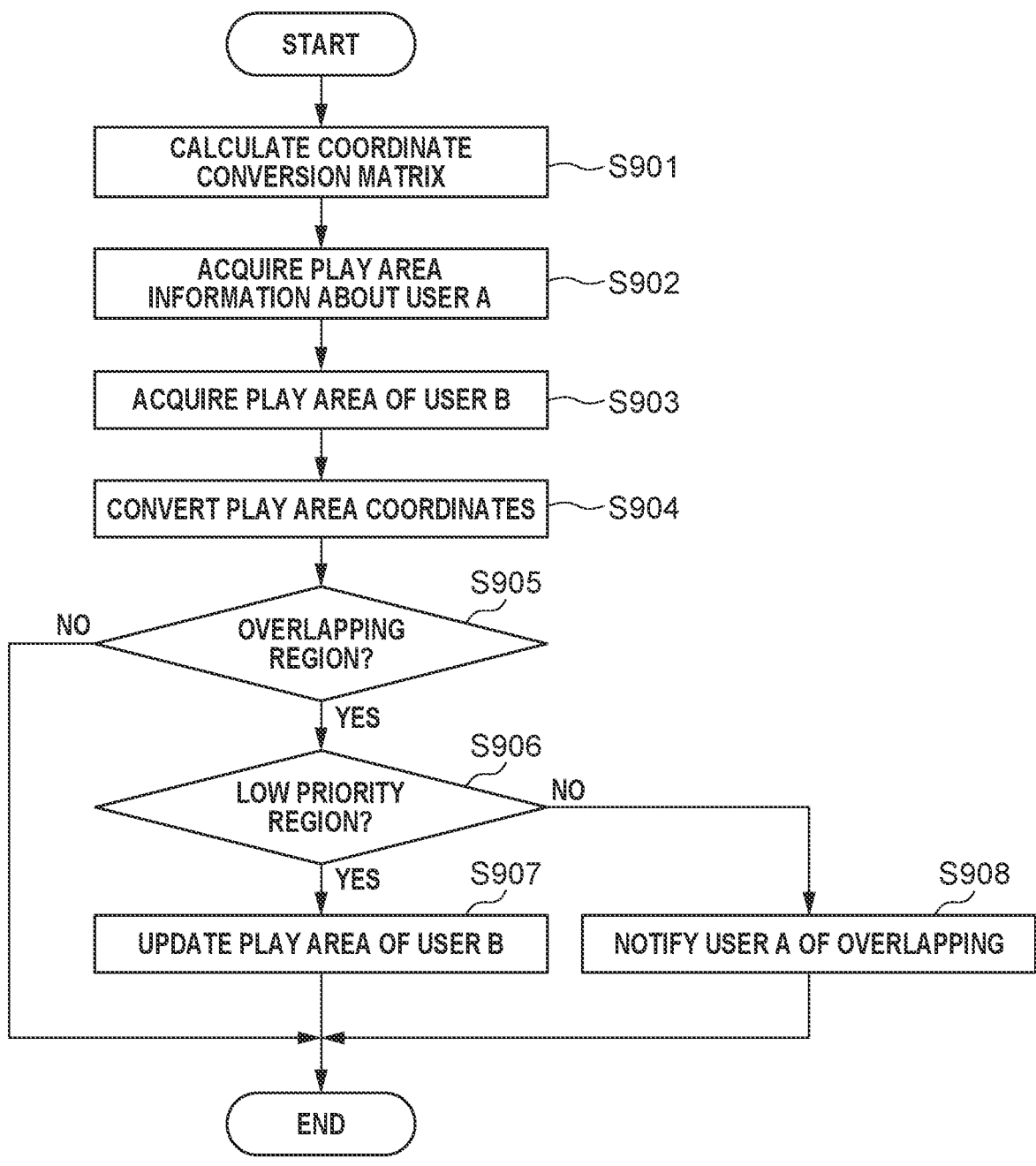
FIG. 9 is a flowchart illustrating another example of processing of the image display system.

An example of processing of the image display system according to the present exemplary embodiment will be described below, particularly focusing on the processing of the image processing apparatus 102B, with reference to FIG. 9. The series of processing illustrated in FIG. 9 is implemented when a program stored in the ROM 303 or HDD 304 is loaded into the RAM 302 and then executed by the CPU 301 in the image processing apparatus 102B. Thus, the CPU 301 performs the role of each component illustrated in FIG. 8.

In step S901, the coordinate conversion matrix calculation unit 8011 calculates a coordinate conversion matrix MB for converting the local coordinate system 402 corresponding to user B into the world coordinate system based on data of the captured image in the real space reflecting the AR marker captured by the imaging unit 502. The coordinate conversion matrix calculation unit 8011 acquires the coordinate conversion matrix MA for converting the local coordinate system 401 corresponding to user A into the world coordinate system from image processing apparatus 102A through communication via the communication unit 504.

In step S902, the play area information acquisition unit 8012 acquires the play area information corresponding to user A from the image processing apparatus 102A through communication via the communication unit 504. Although the present exemplary embodiment will be described below on the premise that the play areas are circular-shaped for the sake of simplification, the shapes of the play areas are not limited to the circular shape. The play area information according to the present exemplary embodiment includes information indicating the center coordinates and radius of the circle as information for setting a range of the target play area.

Figure 10:
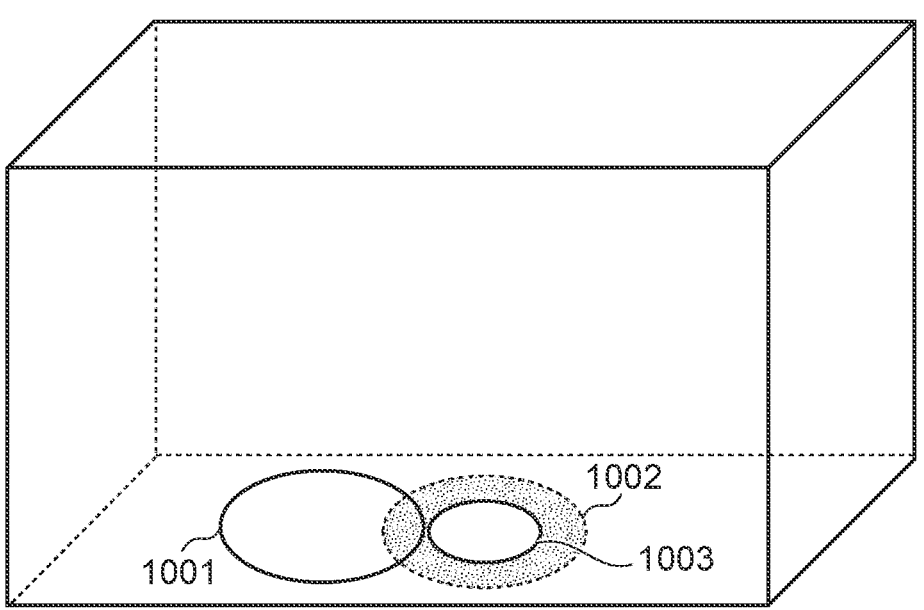
FIG. 10 illustrates examples of play areas.

FIG. 10 illustrates examples of play areas according to the present exemplary embodiment. Referring to the examples in FIG. 10, a play area 1001 indicates the play area set for user A.

In step S903, the play area acquisition unit 8016 acquires information about the preset play area of user B to recognize the play area. For this play area, a priority is preset for each region. As a specific example, the play area acquisition unit 8016 acquires information indicating the center coordinates and radius of the circle as the play area corresponding to user B in the local coordinate system. According to the present exemplary embodiment, the information indicating the radius of a circle as a play area includes a value indicating the boundary where the priority is changed and a value indicating the entire play area.

Referring to FIG. 10, the region 1002 indicates a region with a "Low" priority setting out of the play area corresponding to user B indicated by the information acquired in the processing in step S903. The region 1003 is a region with a "High" priority setting out of the play area corresponding to user B.

In step S904, the coordinate conversion unit 8013 performs the coordinate conversion applicable to the play area setting. As a specific example, the coordinate conversion unit 8013 converts the center coordinates of the circle as the play area corresponding to user B set in step S903 into the world coordinate system by using the coordinate conversion matrix MB calculated in step S901. The coordinate conversion unit 8013 also converts the center coordinates of the circle as the play area of user A acquired in step S902 into the world coordinate system by using the coordinate conversion matrix MA acquired in step S901.

In step S905, the region determination unit 8014 determines whether the play areas of users A and B overlap each other by using information about the center coordinates of the play areas corresponding to users A and B converted in step S904 and the radii of the circles indicating the play areas.

When the region determination unit 8014 determines that the play areas of users A and B overlap each other (YES in step S905), the processing proceeds to step S906.

On the other hand, when the region determination unit 8014 determines that the play areas of users A and B do not overlap each other (NO in step S905), the processing exits the flowchart in FIG. 9.

In step S906, the region determination unit 8014 determines whether the region overlapping with the play area corresponding to user A out of the play area corresponding to user B is a region having a "Low" priority setting.

When the region determination unit 8014 determines that the region overlapping with the play area corresponding to user A out of the play area corresponding to user B is a region having a "Low" priority setting (YES in step S906), the processing proceeds to step S907.

On the other hand, when the region determination unit 8014 determines that the region overlapping with the play area corresponding to user A out of the play area corresponding to user B is not a region having a "Low" priority setting (NO in step S906), the processing proceeds to step S908.

In step S907, the play area updating unit 8015 resizes the play area corresponding to user B so as to exclude the region overlapping with the play area corresponding to user A out of the play area corresponding to user B, thus updating the play area. As a specific example, the play area updating unit 8015 changes the radius of the circle as the target play area to resize the play area. In this case, the play area updating unit 8015 may change the radius of the circle as the play area corresponding to user B so that the play area coincides with the region having a "High" priority setting. As another example, the play area updating unit 8015 may change the radius of the circle as the play area corresponding to user B so that the region having a "Low" priority setting is left as long as the relevant range does not overlap with the play area of user A.

Referring to FIG. 10, the region 1003 indicates an example of a region for the play area corresponding to user B updated by the processing in step S907. Referring to the examples in FIG. 10, the target play area is updated by being resized so that the updated play area coincides with the region having a "High" priority setting.

In step S908, the notification processing unit 8017 communicates with the image processing apparatus 102A via the communication unit 504 to instruct the image processing apparatus 102A to notify user A of information indicating that the play areas overlap each other. This enables user A to recognize that the play areas overlap each other, and update the relevant play area as required.

The above-described processing enables updating the play area corresponding to user B according to the play area information corresponding to user A and the priority set for the play area corresponding to user B so that the play areas of users A and B do not overlap each other. This processing enables resolving the contention between the play areas of users A and B. This makes it possible to prevent the occurrence of an event such as a user colliding with another user during the experiencing of a VR content by using the HMD 101.

Desirably, the timing when the play area is updated is suitably set according to an applied use case. As a specific example, it may not be desirable to update the play area while user B is experiencing a VR content.

In such a case, for example, a timing when the operation of an application for associating play area display may be set as a timing to permit updating the play area, like a VR content application. The CPU 301 needs to apply control in which the update timing acquisition unit 8018 acquires this timing information to recognize the timing, and the play area updating unit 8015 updates the play area at the timing.

When updating the play area, the CPU 301 may not only simply change the radius of the circle, but the CPU 301 may also perform update processing accompanied by the shape change of the play area so that only the overlapping region is excluded. In this case, according the changed shape, the play area information needs to include coordinate information that can represent the changed shape.

The present disclosure can also be achieved when computer-executable instructions (e.g., a program) for implementing at least one of the functions according to the above-described exemplary embodiments is supplied to a system or apparatus via a network or storage medium, and at least one processor in a computer of the system or apparatus reads and executes the computer-executable instructions. Further, some embodiments of the present disclosure can also be achieved by a circuit, such as an Application Specific Integrated Circuit (ASIC) for implementing at least one function.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

Some of the present exemplary embodiments make it possible to suitably set a play area for each of a plurality of users even in a situation where the plurality of users shares a space.

This application claims priority to Japanese Patent Application No. 2023-035957, which was filed on Mar. 8, 2023 and which is hereby incorporated by reference herein in its entirety.

What is claimed is:

1. An information processing apparatus comprising
one or more processors; and
one or more memories, wherein the one or more processors and the one or more memories are configured to:
acquire play area information about a first play area indicating a movable range of a first user in a real space;
set a second play area indicating a movable range of a second user in the real space;
set the second play area according to whether the first play area overlaps the set second play area; and
generate a display that display information that indicates the first play area and information that indicates the second play area,
wherein, in a case where the first play area overlaps the second play area and a priority setting of the second play area is lower than a priority setting of the first play area in a region where the first play area overlaps the second play area, the second play area is set to exclude the region that overlaps the first play area out of the second play area.

2. The information processing apparatus according to claim 1, wherein the one or more processors and the one or more memories are further configured to:
determine whether the first play area overlaps the second play area, based on the play area information.

3. The information processing apparatus according to claim 1, wherein the one or more processors and the one or more memories are further configured to, in a case where the first play area overlaps the second play area and the priority setting of the second play areas is higher than the priority setting of the first play area in the region where the first play area overlaps the second play area, notify the first user that the first play area overlaps the second play area.

4. The information processing apparatus according to claim 1, further comprising a display configured to display play area information about a play area set for a predetermined user in a predetermined display area.

5. The information processing apparatus according to claim 4, wherein the display displays play area information about the first play area set for the first user.

6. The information processing apparatus according to claim 4, wherein, in a case where the first play area overlaps the second play area, the display displays information indicating that the first play area overlaps the second play area.

7. The information processing apparatus according to claim 1, wherein the one or more processors and the one or more memories are further configured to:
set a timing to permit updating a play area; and
update the first play area or the second play area at the set timing.

8. The information processing apparatus according to claim 7, wherein the timing is set to a timing when an operation of an application for associating play area display is suspended.

9. A method for controlling an information processing apparatus, the method comprising:
acquiring play area information about a first play area indicating a movable range of a first user in a real space;
setting a second play area indicating a movable range of a second user in the real space;
setting the second play area according to whether the first play area overlaps the set second play area; and
generating a display that display information that indicates the first play area and information that indicates the second play area, wherein, in a case where the first play area overlaps the second play area and a priority setting of the second play area is lower than a priority setting of the first play area in a region where the first play area overlaps the second play area, the second play area is set to exclude the region that overlaps the first play area out of the second play area, and wherein acquiring the play area information, setting the second play area, and generating the display are performed by one or more processors.

* * * * *